US009569272B2

(12) United States Patent
Thonnart (10) Patent No.: US 9,569,272 B2
(45) Date of Patent: Feb. 14, 2017

(54) DEVICE AND METHOD FOR THE DISTRIBUTED EXECUTION OF DIGITAL DATA PROCESSING OPERATIONS

(75) Inventor: Yvain Thonnart, Grenoble (FR)

(73) Assignee: Commissariat a l'energie atomique et aux alternatives, Paris (FR)

(*) Notice: Subject to any disclaimer, the term of this patent is extended or adjusted under 35 U.S.C. 154(b) by 1076 days.

(21) Appl. No.: 12/833,418

(22) Filed: Jul. 9, 2010

(65) Prior Publication Data

US 2011/0016293 A1 Jan. 20, 2011

(30) Foreign Application Priority Data

Jul. 15, 2009 (FR) ...................................... 09 54903

(51) Int. Cl.
*G06F 9/50* (2006.01)
(52) U.S. Cl.
CPC .................................. *G06F 9/5066* (2013.01)
(58) Field of Classification Search
CPC ............................................... G06F 9/5066
USPC ......................................................... 712/201
See application file for complete search history.

(56) References Cited

U.S. PATENT DOCUMENTS

| 2007/0150877 | A1* | 6/2007 | Emmett et al. | 717/149 |
|---|---|---|---|---|
| 2007/0217439 | A1* | 9/2007 | Lemaire et al. | 370/419 |
| 2007/0283358 | A1* | 12/2007 | Kasahara et al. | 718/104 |
| 2008/0098208 | A1* | 4/2008 | Reid et al. | 712/234 |
| 2008/0114937 | A1* | 5/2008 | Reid et al. | 711/117 |
| 2013/0232495 | A1* | 9/2013 | Rossbach et al. | 718/102 |

OTHER PUBLICATIONS

Thonnart, Y.; Lemaire, R.; Clermidy, F., "Distributed Sequencing for Resource Sharing in Multi-applicative Heterogeneous NoC Platforms," Networks-on-Chip (NOCS), 2010 Fourth ACM/IEEE International Symposium on , vol., no., pp. 233,240, May 3-6, 2010.*
Arturo Gonzalez-Escribano, et al. "Mapping Unstructured Applications into Nested Parallelism", VECPAR, 2002, XP-002579714, pp. 407-420. url: http://www.springerlink.com/content/4kk5ymk8593ktn09/fulltext.pdf.

(Continued)

*Primary Examiner* — Andrew Caldwell
*Assistant Examiner* — Jyoti Mehta
(74) *Attorney, Agent, or Firm* — Oblon, McClelland, Maier & Neustadt, L.L.P.

(57) ABSTRACT

A method and device for digital data processing based on a data flow processing model is suitable for the execution, in a distributed manner on multiple calculation nodes, of multiple data processing operations modelled by directed graphs, where two different processing operations include at least one common calculation node. The device includes an identification processor configured to, from a valued directed multi-graph made up of the union of several distinct processing graphs and divided into several valued directed sub-multi-graphs, called chunks, and whose input and output nodes are buffer memory nodes of the multi-graph, identify a coordination module for each chunk. Furthermore each identified coordination module is configured to synchronize portions of processing operations that are to be executed in the chunk with which the respective coordination module is associated, independently of portions of processing operations that are to be executed in other chunks.

13 Claims, 4 Drawing Sheets

(56) References Cited

OTHER PUBLICATIONS

Arturo Gonzalez-Escribano, et al. "SPC-XML: A Structured Representation for Nested-Parallel Programming Languages", Euro-Par 2005 Parallel Processing, Lecture notes in Computer Science, XP-019014887, vol. 3648, Aug. 4, 2005. pp. 782-792.

Youngchul Cho, et al. "Code Decomposition and Recomposition for Enhancing Embedded Software Performance", Design Automation Conference, IEEE, XP-031434316, 2009. pp. 624-629.

Miri Priesler, et al. "On some multigraph decomposition problems and their computational complexity", Discrete Mathematics, XP-002579715, vol. 281, Apr. 28, 2004. pp. 247-254.

* cited by examiner

DEVICE AND METHOD FOR THE DISTRIBUTED EXECUTION OF DIGITAL DATA PROCESSING OPERATIONS

The present invention relates to a device for processing digital data using distributed execution of multiple data processing operations over multiple calculation nodes. It also relates to a method for the distributed execution of multiple data processing operations on multiple calculation nodes of such a device.

It applies in particular to devices for processing data of the system on electronic chip type, which include multiple integrated and interconnected microprocessors suitable for executing processing operations in parallel.

More precisely, the invention relates to a device for processing digital data which uses a data-flow processing model in which each data processing operation destined to be executed on the device is modelled by a directed graph which includes calculation nodes, buffer memory nodes and directed links for transferring data between these nodes from at least one input buffer memory node to at least one output buffer memory node, where two different processing operations can share resources, that is, can include at least one common calculation node.

In the context of the invention, "processing operation" means a succession of elementary operations, the execution of which is distributed over the device and gives the device a precise functionality. A processing operation receives input data and supplies output data through the application of this functionality to the input data. It corresponds to a maximum set of interdependent exchanges of data flows between device resources, from input memories up to output memories of the device, without the need to reprogram its architecture.

"Calculation node" means a material resource of the device which is of the calculator type, such as a microprocessor or portion of a microprocessor dedicated to the execution of a predetermined function in a processing operation. A calculation node is potentially "multivalent", that is, it may be used for several processing operations. It has, for each potential processing operation, one or more inputs and one or more outputs.

"Buffer memory node" means a material resource of the device which is of the memory type, such as a RAM or other memory zone, dedicated to temporary storage of data in a processing operation: such a resource is commonly referred to as a "buffer" and is filled with or emptied of data in accordance with a FIFO ("First In First Out") type of logic. A buffer memory node is "monovalent", that is, it may only be used for a single processing operation. There is no specific condition imposed between its inputs and outputs, but it is nevertheless necessary to ensure that it can empty itself of its data for the execution of a processing operation independently of other processing operations. In practice, buffer memory nodes may be grouped together, for example in fours, within buffer memory blocks.

Also in the context of the invention, a "data flow processing model device", as opposed to a shared memory device, means an architectural model made up of several material resources linked to each other by data flows. According to this model, information travels asynchronously in the network made up of the material resources that are linked together and is transformed by the various components that it passes through, in particular by the calculation nodes.

Thus, in this context, a processing operation can in fact be univocally modelled by a directed graph whose vertices are calculation nodes and buffer memory nodes and whose arcs are directed data transfer links between these nodes. Since a processing operation receives input data and supplies output data, the graph representing it necessarily includes one or more input nodes and one or more output nodes of the buffer memory type.

Furthermore, a processing operation may advantageously be structurally broken down using buffer memory nodes which are arranged, with the calculation nodes called by this processing operation, between the input and output nodes. A processing operation may also be sequentially subdivided into a succession of "sessions", each of which forms a sufficient set of operations and of data transfers between buffer memory nodes. At the conclusion of a session, the various buffer memory nodes in the graph which represents the processing operation have sent and/or received a certain quantity of data, and each of the calculation nodes through which this data has passed is in a state which does not require the transfer of additional data: the sessions in a processing operation are defined by ensuring that each data transfer between calculation nodes is a multiple of the minimum processing granularity for this calculation node.

At the level of a calculation node of the graph which represents a processing operation, the latter is viewed as a predefined "task" to be carried out in this calculation node: the task is a succession of all elementary operations that the calculation node under consideration must execute to carry out the processing operation at the complete graph level. The sequential subdivision of the processing operation into sessions therefore affects this calculation node at the level of the task to be carried out, itself divided into a succession of sessions A major difficulty for the type of aforementioned device is synchronisation of the various processing operations so that they may be executed simultaneously in the most autonomous manner possible, whilst sharing certain of the device resources. This synchronisation affects each resource whose output data must always be capable of being used by the receiving resources. Synchronisation cannot be guaranteed point to point in each link in the processing graphs because the data flows through these links are not linear, due to the fact that certain resources in the device have several inputs and/or outputs. Therefore it is generally chosen to carry out a centralised control of tasks executed by the resources, in general programmed on a dedicated component of the processing device This centralised synchronisation, however, raises issues because it leads to a non-optimised use of the overall architecture of the device and of its resources. In particular, certain calculation nodes may remain inactive during a processing operation whereas they could have independently started a new session corresponding to another processing operation.

It may thus be desirable to provide a device for distributed execution of multiple processing operations which can overcome or at least mitigate this problem.

The subject of the invention therefore is a device for processing digital data, in particular of the system on electronic chip type, using distributed execution of multiple data processing operations on multiple calculation nodes using a data flow processing model in which each data processing operation destined to be carried out on the device is modelled by a directed graph which is made up of calculation nodes, buffer memory nodes and directed links for transferring data between these nodes from at least one input buffer memory node to at least one output buffer memory node, where two different processing operations may include at least one common calculation node, wherein this processing device includes means for identifying, from a valued directed multi-graph made up of the union of several distinct processing graphs divided into several valued directed sub-multi-graphs called chunks and whose input and output nodes are buffer memory nodes of the multi-graph, a coordination module for each chunk, and wherein each identified coordination module is designed to synchronise portions of processing operations destined to be executed in the chunk with which it is associated independently of portions of processing operations destined to be executed in other chunks.

Since each executable processing operation on the device is represented by a directed graph, the set of these shared resource processing operations may be represented by the union of these directed graphs, namely a valued directed multi-graph. This is a valued multi-graph since between two nodes there may be several valued links which correspond to different processing operations, with each link being valued by corresponding processing operation identifier.

Thus, by considering synchronisation not in a centralised manner, but independently at each chunk resulting from the division of the multi-graph into sub-portions, the loading of resources is improved because the problem of synchronisation of multiple processing operations is restricted to sub-portions of the complete system delimited by buffer memory nodes used. The processing operations are synchronised over an entire given chunk, for which a sequencing of sessions may be defined, notably in accordance with known communication protocols. The coordination of the various processing operations may then be regarded as being globally distributed and locally centralised.

Optionally, each coordination module is one of the calculation nodes of the chunk with which it is associated.

Also optionally, the identification means of the coordination module of any one whatsoever of the chunks includes directed links referred to as "virtual" links for the transmition of information messages without transmission of the data to be processed, established, besides the said data transfer links, between the coordination module and other nodes in the chunk.

Also optionally, each calculation node of any one whatsoever of the chunks is configured so that:
  it can only start a portion of processing operation once it has received at least one information message for starting this portion of processing operation coming from at least one other predetermined node in its chunk via at least one of the directed links of the graph for this processing operation, and
  it can send at least one information message for starting this portion of processing operation to at least one other predetermined node in its chunk via at least one of the directed links of the graph for this processing operation, as soon as it has started this portion of the processing operation.

Another subject of the invention is a distributed execution method for multiple data processing operations on multiple calculation nodes of a device for processing digital data, in particular a system on electronic chip, which uses a dataflow processing model in which each data processing operation destined to be executed on the device is modelled by a directed graph which includes calculation nodes, buffer memory nodes and directed links for transferring data between these nodes from at least one input buffer memory node to at least one output buffer memory node, where two different processing operations can include at least one common calculation node, with this method including the following steps:
  from a valued directed multi-graph made up of the union of several distinct processing graphs, division of this multi-graph into several valued directed sub-multi-graphs called chunks, where the input and output nodes of each chunk are buffer memory nodes,
  identification of a coordination module for each chunk.
  synchronisation of portions of processing operations that are destined to be executed in each chunk by the corresponding coordination module, independently of the synchronization of portions of processing operations destined to be executed in the other chunks.

This method may optionally include a step for automatic selection of the coordination module for each chunk.

The step for automatic selection of the coordination module for a chunk may also optionally include the following sub-steps:
  subdivision of the chunk into three disjoint sub-sets, where the first sub-set, referred to as the "source univalent set" includes all the input nodes of the chunk and all its other univalent nodes which may be reached from the input nodes but not from a multivalent node, where the second subset, referred to as the "sink univalent set" includes all the output nodes of the chunk and all other univalent nodes which may reach the output nodes but not a multivalent node, and where the third subset, referred to as the "multivalent set", includes all the nodes of the chunk which do not belong to either the first or second sub-set,
  selection of the coordination module from one of the calculation nodes of the multivalent set which are destinations of a data transfer directed link which comes from the source univalent set, in accordance with a predetermined criterion.

Also optionally, the predetermined selection criterion is an element selected from the set made up of:
  the destination calculation node of a directed link from the source univalent set which exhibits most links leaving to other destination nodes of a directed link coming from the source univalent set, and
  the destination calculation node of a directed link from the source univalent set which receives the most input links from nodes of the source univalent set.

Also optionally, the step for identification of the coordination module of each chunk includes the establishment of directed links referred to as "virtual" links for the transmission of information messages without transmission of the data to be processed, besides the said data transfer links, between the coordination module and other nodes of the chunk.

Finally, also optionally, the step for identification of the coordination module for each chunk includes the following sub-steps for each directed data transfer link, referred to as transition link, which comes from the source univalent set and which points towards the multivalent set.
  a new virtual link is created between the node of origin of this transition link and the coordination module, if a link or set of links does not already exist for the same processing operation between the node of origin of this transition link and the coordination module, and
  a new virtual link is created between the coordination module and the node towards which the transition link points, if a link or set of links does not already exist for the same processing operation between the coordination module and the node towards which the transition link points.

The invention will be better understood with the help of the following description, given solely by way of an example, whilst referring to the appended drawings, in which.

Figure 1:
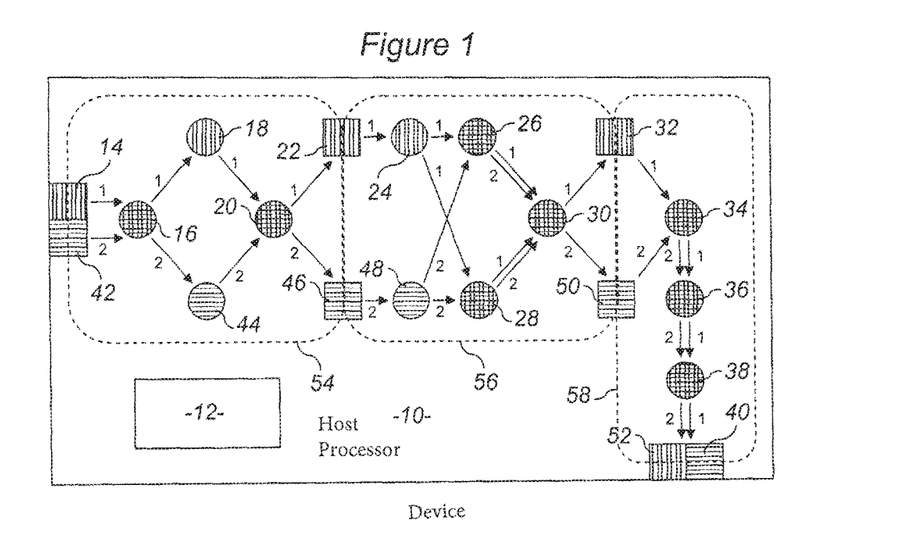
FIG. 1 is a schematic representation of the general functional structure of a data processing device according to one embodiment of the invention.

The device for processing digital data 10 represented in FIG. 1 is, for example, a data-flow processing model device of the system on electronic chip type, which includes multiple integrated and interconnected microprocessors for executing several processing operations in parallel. It includes in particular a host processor 12 and multiple resources 14 to 52 which take part in the distributed execution of the processing operations programmed on this device 10.

These resources are represented in a functional manner in FIG. 1. They include buffer memory nodes and calculation nodes which may by called by the processing operations that are executable on the device. In the simple but non-restrictive example shown in this figure, two processing operations are envisaged on the device 10 and are represented by a valued directed multi-graph whose data transfer links are identified either by the index "1" for the first of the two processing operations or by the index "2" for the second of the two processing operations. The nodes called by the first processing operation include vertical stripes in FIG. 1. Those called by the second processing operation include horizontal stripes. Consequently the multivalent nodes, called by both processing operations, include both vertical and horizontal stripes.

The valued directed multi-graph is the result of a first directed graph which represents the first processing operation and a second directed graph which represents the second processing operation.

The first graph includes an input buffer memory node 14, then, in the order of the first processing operation indicated by the data transfer links referenced by the index "1", a calculation node 16, a calculation node 18, a calculation node 20, a buffer memory node 22, a calculation node 24, two calculation nodes 26 and 28, a calculation node 30, a buffer memory node 32, a calculation node 34, a calculation node 36, a calculation node 38 and an output buffer memory node 40. The first processing operation is therefore broken up structurally by means of the buffer memory nodes 22 and 32.

The second graph includes an input buffer memory node 42, then, in the order of the second processing operation indicated by the data transfer links referenced by the index "2", the calculation node 16, a calculation node 44, the calculation node 20, a buffer memory node 46, a calculation node 48, the two calculation nodes 26 and 28, the calculation node 30, a buffer memory node 50, the calculation node 34, the calculation node 36, the calculation node 38 and an output buffer memory node 52. The second processing operation is therefore broken up structurally by means of the buffer memory nodes 46 and 50.

Calculation nodes 16, 20, 26, 28, 30, 34, 36 and 38 are common to both processing operations and are therefore multivalent.

Because of the structural parcelling of the two processing operations, the valued directed multi-graph is itself structurally broken up into several valued directed sub-multi-graphs, called chunks, whose input and output nodes are buffer memory nodes of the multi-graph. A first chunk 54 includes nodes 14, 16, 18, 20, 22, 42, 44 and 46 of which buffer memory nodes 14 and 42 form the input nodes, and buffer memory nodes 22 and 46 form the output nodes. A second chunk 56 includes nodes 22, 24, 26, 28, 30, 32, 46, 48 and 50 of which buffer memory nodes 22 and 46 form the input nodes, and buffer memory nodes 32 and 50 form the output nodes. A third chunk 58 includes nodes 32, 34, 36, 38, 40, 50 and 52 of which buffer memory nodes 32 et 50 form the input nodes and the buffer memory nodes 40 and 52 form the output nodes.

The division of the multi-graph into chunks may be defined a priori and implemented during the integration of the buffer memory nodes, of the calculation nodes and of their respective functions into the device 10. It may also be carried out automatically, in particular by the host processor 12, on the basis of the structural organisation of the buffer memory nodes in the multi-graph. This means that if the "dependency cone" of a buffer memory node is defined as the set of calculation nodes located on a path of the same processing operation from this buffer memory node to another buffer memory node, called the extreme node of this dependency cone, and if an "interference relationship" between two buffer memory nodes is defined as a relationship established between two nodes from the time when these nodes are the extremes of dependency cones which have common calculation nodes, then the chunks of the multi-graph can be defined as the equivalence classes for this interference relationship. The automatic determination of the chunks by means of appropriate programming of the host processor 12 can be envisaged.

It will be seen that there is preferably no looping (i.e. a closed circuit of directed links) of the processing graphs, and therefore of the multi-graph over a given buffer memory node, so that there can be no "deadlock" (designating the inter-locking that occurs when two tasks executed at the same time on two different calculation nodes are each waiting for data coming from the other).

According to the invention, there is a coordination module identified for each chunk 54, 56 and 58. More specifically it is designed to synchronise the portions of processing operations destined to be executed in the chunk with which it is associated, independently of the portions of processing operations destined to be executed in other chunks. When the processing operations are sequentially divided into successive sessions, the coordination module is designed to synchronise the sessions of different processing operations within the chunk with which it is associated. This coordination module may be external or may belong to the chunk with which it is associated.

Figure 3:
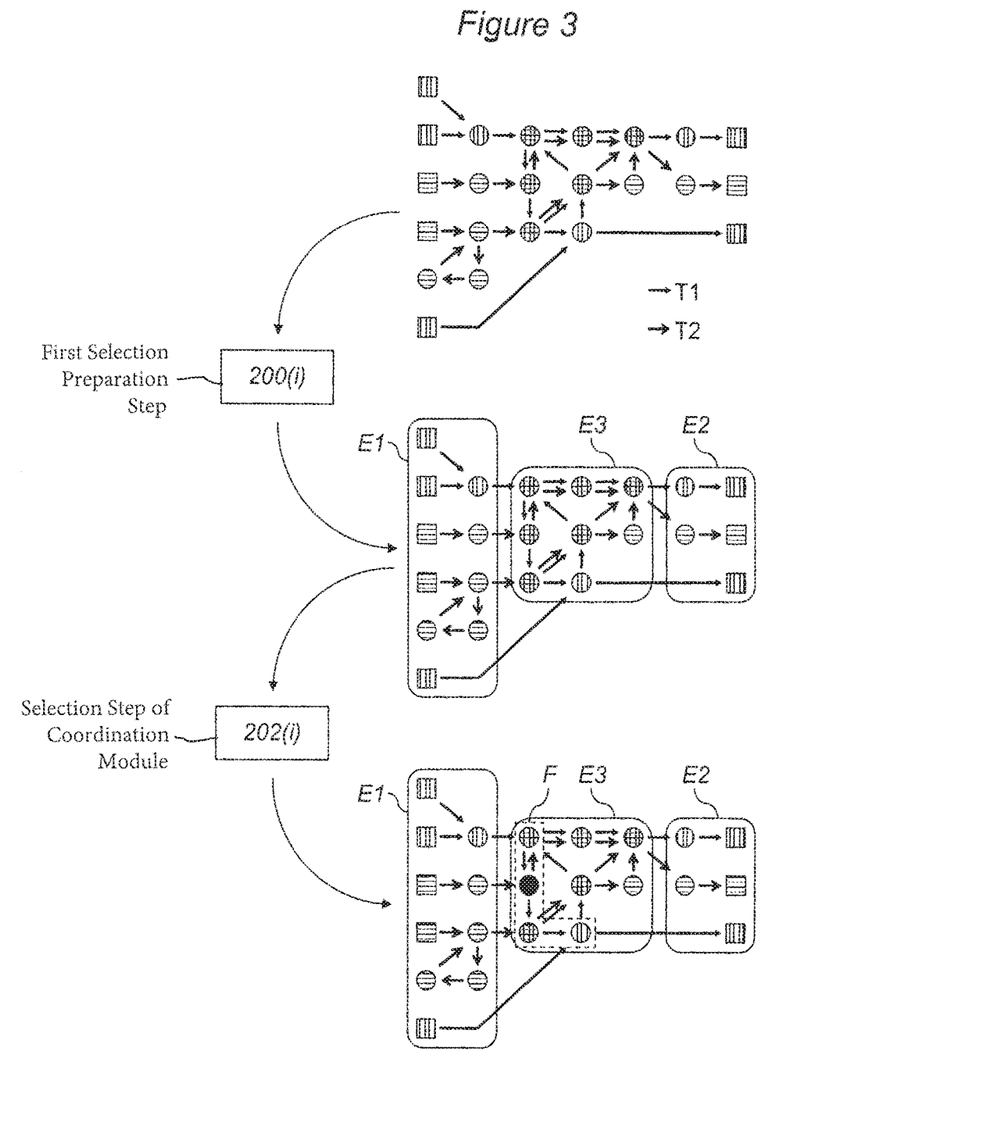
FIGS. 3 and 4 show in detail the operation of certain steps in the method in FIG. 2 using a specific example of multiple processing operations.
Figure 4:
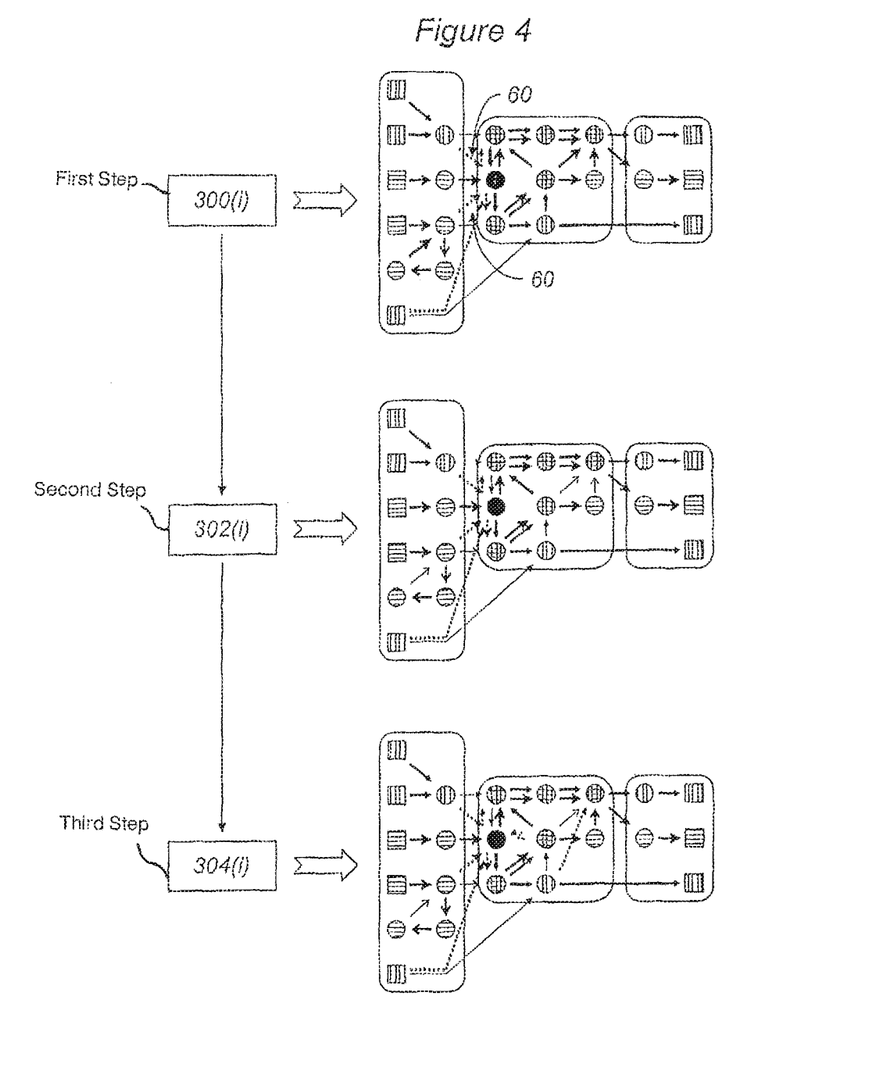

In one preferred but non-restrictive embodiment, details of which will be given with reference to FIGS. 3 to 5, each chunk includes a coordination module chosen from one of its calculation nodes. In the example in FIG. 1, the calculation nodes 16, 26 and 34 may thus be selected to be the respective coordination modules of chunks 54, 56 and 58. In the embodiment whose details will be given with reference to FIGS. 3 to 5, an automatic method for the selection of the coordination module for each chunk will also be described. Such an automatic selection method may, for example, be implemented by the host processor 12 which then possesses the programme code instructions for executing its successive steps.

Device 10 finally includes means of identifying the coordination module for each chunk. These means may be the host processor 12 itself, which then manages the unique identifiers of the coordination modules. In this case it is also the host processor which may include code instructions for the implementation, by each selected and identified coordination module, of a method for the synchronisation of processing operations within each chunk, in accordance, for example, with a known communication protocol. Alternatively, the means of identification of the coordination modules may be explicitly (by means of a specific marker) or implicitly (by means of its structure) integrated in the chunks themselves. Such a variant will be shown by the embodiment whose details will be given with reference to FIGS. 3 to 5.

Figure 2:
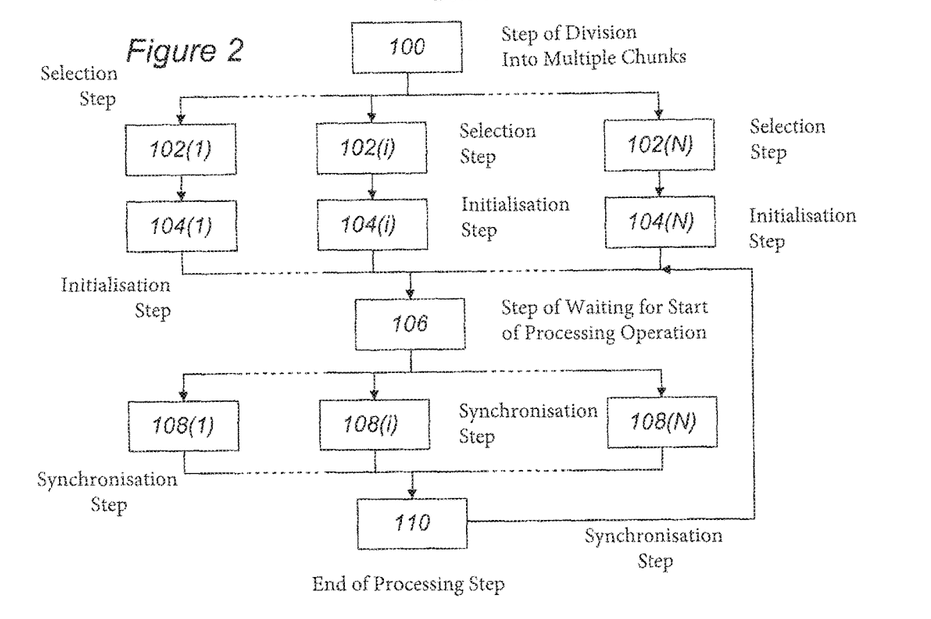
FIG. 2 shows the successive steps in a distributed execution method for multiple data processing operations, according to one embodiment of the invention.

The method whose successive steps are illustrated in FIG. 2 includes a first phase for structuring and initialisation of a multi-graph of processing operations implemented in the device 10 and a second phase of distributed execution of the processing operations of this multi-graph in the device 10.

The first structuring and initialisation phase includes a first step 100 for division of the multi-graph into multiple chunks such as chunks 54, 56 and 58 in the example shown in FIG. 1. As stated previously, this first division step may be executed automatically by the host processor 12 of the device 10. It ends with the identification of N chunks.

Then, during N selection steps 102 (1), ... 102(i), ... 102(N) respectively applied to the N chunks identified beforehand, a coordination module is selected for each chunk. As was also stated earlier, an automatic procedure for selection of the coordination module for each chunk may be implemented, in particular by the host processor 12. Details of a specific embodiment of any of the selection steps 102(i) will be given with reference to FIG. 3.

Finally the first structuring and initialisation phase is completed if necessary by the execution of N initialisation steps 104(1), ... 104(i), ... 104(N) applied respectively to the N previously identified chunks. During each of these steps, the corresponding chunk and its coordination module are initialised in order to be able to synchronise the processing sessions destined to be executed in accordance with a predetermined communication protocol. The initialisation will naturally depend on the protocol used. An example of initialisation will be illustrated with reference to FIG. 4, in the context of a communication protocol, details of which will be given with the help of FIG. 5. In this example, the initialisation of the chunk allows identification of its coordination module.

Once the first structuring and initialisation phase is terminated, the device 10 is ready for the implementation of the second phase of distributed execution of processing operations implemented in the device 10.

This second phase includes a step 106 of waiting for the start of at least one processing operation in the device 10. The start of a processing operation is called once digital data is received by one of its input buffer memory nodes. Consequently step 106 can be considered as detecting the start of at least one processing operation once digital data is received by at least one of the input buffer memory nodes of the processing multi-graph.

Following this detection, for proper distributed execution of the multiple processing operations in the N chunks of the device 10, N synchronisation steps 108(1), ... 108(i), ... 108(N) are then executed independently of each other for each chunk according to a predetermined communication protocol. The latter may be chosen among known synchronisation protocols, but advantageously may also be in accordance with the one whose details will be given with reference to FIG. 5.

Since each processing operation may be sequentially subdivided into multiple sessions which have to be executed in the relevant chunks of the multi-graph, it will be noted that synchronisation in a chunk involves coordinating the execution of sessions from different processing operations. This means that the problem of synchronisation of two sessions of a given processing operation does not arise since their sequence of execution is predetermined.

When all sessions of all processing operations that are executed have terminated in all chunks, there is an end of processing step 110, then a return is made, for example, to upstream of step 106 to await at least one new processing operation to execute.

Details of any of the steps 102(i) whatsoever to select a coordination module for a given chunk i will now be given with reference to FIG. 3, in accordance with a specific selection embodiment, which may be carried out automatically. In this diagram, a single chunk of any multi-graph whatsoever for two processing operations T1 and T2 is shown. It is given as a purely illustrative and non-restrictive example, and in particular has no specific link with the multi-graph in FIG. 1.

In this chunk, the nodes called by the first processing operation T1 include vertical stripes and those called by the second processing operation T2 include horizontal stripes. Consequently the multivalent nodes, called by both processing operations, include both vertical and horizontal stripes. For the sake of clarity, in FIG. 3, unlike the illustration rules chosen for FIG. 1, the values of the valued directed data transmission links for the chunk are not shown, but the links themselves are represented by various arrows, depending on whether they belong to the first or second processing operations. It will be seen that in this particular example, the chunk in question includes five input buffer memory nodes, three of which are associated with the first processing operation T1 and two with the second processing operation T2; it includes in addition three output buffer memory nodes, two of which are associated with the first processing operation T1 and one with the second processing operation T2.

In a first selection preparation step 200(i), the chunk i is subdivided into three separate subsets E1, E2 and E3. The first subset E1, referred to as the "source univalent set" for the chunk includes all the input nodes of the chunk and all its other univalent nodes which may be reached (via the aforementioned links) from the input nodes, but not by a multivalent node. The second subset E2, referred to as the "sink univalent set" for the chunk includes all the output nodes of the chunk and all its other univalent nodes which may reach the output nodes but not a multivalent node. Finally, the third subset E3, referred to as the "multivalent set" for the chunk includes all the nodes in the chunk which belong to neither E1 nor E2. Set E3 in particular includes all the multivalent nodes in the chunk.

During a second step 202 (i) which is in itself a selection step, a coordination module for the chunk under consideration is selected from the calculation nodes of the multivalent set E3. More precisely, if the "source multivalent frontier" F of the multivalent set E3 is defined as being the set of nodes of E3 which are the destination of a directed link form the source univalent set E1, a criterion for the selection of the coordination module may be as follows: the calculation node of the source multivalent frontier F that exhibits the most output links to other nodes of the source multivalent frontier F is selected as the coordination module. In the example shown in FIG. 3, this is the calculation node shown in black at the end of step 202(i). As an additional or alternative criterion, the calculation node of the source multivalent frontier F which receives the most input links from the nodes of the source univalent set E1 can also be selected as a coordination module.

The selection of one coordination module per chunk could also be predetermined by an operator. But, as described earlier, any one of steps 102(i) may be executed automatically by the device 10 from knowledge of the multi-graph subdivided into chunks, using the deterministic definition of the choice of coordination module. More precisely, steps 200(i) and 202(i) may, for example, be executed by the host processor 12 and the results of these steps (subsets E1, E2, E3, F, and identification of the coordination module) then stored in memory in the device 10. In particular, step 200(i) may be executed from an algorithmic point of view by first of all seeking the multivalent calculation nodes of a chunk by exploring the successors of the input nodes of this chunk, in particular by identifying the nodes that are accessible from at least two input nodes associated with different processing operations; then, for each univalent node of the chunk, exploring the graphs of its predecessors and successors to determine whether or not they contain a multivalent node.

Details of any one of the steps 104(i) whatsoever for initialisation of a given chunk i and of its coordination module will now be given with reference to FIG. 4, in accordance with a specific initialisation embodiment which may be executed automatically. For the sake of clarity, in FIG. 4, as in FIG. 3, the values of the valued directed data transmission links for the chunk are not shown, but the links themselves are represented by various arrows depending on whether they belong to the first or second processing operations. In addition, the chunk that is shown in FIG. 4 is the same as that in FIG. 3.

It should be noted beforehand that the directed links of the chunk under consideration at the end of step 102(i) are defined as real and primary links.

The term "real link" means a directed link which embodies the transmission of usable data to the processing operation under consideration between two nodes. Conversely, a link is said to be "virtual" when it is only used to transmit signal data (for example session opening information). A real link is represented in FIG. 4 by an unbroken line arrow whereas a virtual link is represented by a broken line arrow.

The term "primary link" refers to a directed link which must be established, by sending a signal message, in order to activate and/or propagate a specific processing session at a node to which it points. Conversely, a link is said to be "secondary" when it is not necessary to establish it by the transmission of a signal message in order to activate/propagate a specific processing session, but when it only serves, apart from possible transmission of usable data, to fulfil the function of providing information on the status of the source node of this link. A primary link is represented in FIG. 4 by a thick line arrow whereas a secondary link is represented by a thin line arrow.

During a first step 300 (i), for each directed real link which points to a node in the source multivalent frontier F other than the selected coordination module:

this link is redefined as a secondary link (unbroken thin line), a new primary virtual link (thick broken line) is created between the node of origin of the link redefined as a secondary link and the coordination module, if a primary real link (unbroken thick line) or set of primary real links does not already exist for the same processing operation between the node of origin of the link redefined as a secondary link and the coordination module, and a new primary virtual link (thick broken line) is created between the coordination module and the node towards which the link redefined as a secondary link points, if a primary real link (unbroken thick line) or a set of primary real links does not already exist for the same processing operation between the coordination module and the node towards which the link redefined as a secondary link points.

These newly created virtual primary links therefore form structural and implicit means 60 of identification of the coordination module, included in the chunk under consideration. In particular, the newly created primary virtual links which point towards the coordination module allow the latter to see all input links in the multivalent set E3, the very set in which, in fact, synchronisation of processing operations, and more specifically of sessions, of the chunk under consideration must be carried out. They therefore enable it to take the correct synchronisation decisions. Furthermore, redefining each link that points towards a node of the source multivalent frontier F, other than the coordination module, as a secondary link prevents calculation nodes other than the selected coordination module from initiating the start of a processing session.

In a second step 302(i), for each processing operation, here T1 and T2, of the chunk, in the multivalent set E3 the minimum spanning tree for the nodes associated with this processing operation which allows signal messages to be sent in all these nodes is determined. The links in this minimum spanning tree remain primary, whilst the other links associated with the processing under consideration in multivalent set E3 are redefined as secondary links (thin lines). Similarly, during this step, if there is at least one cycle of univalent nodes in the chunk, the primary link that closes this cycle is redefined as a secondary link.

Therefore any cycle in the propagation of signal messages relating to a processing operation is avoided.

Finally, during a third step 304(i), the nodes located at terminations (i.e. the leaves) of minimum spanning trees determined in the previous step are linked together by the addition of new virtual primary links (broken thick lines) if necessary. More specifically, one of the leaves in the minimal spanning trees is selected and checks are made that all other leaves are linked, directly or indirectly, to this leaf via one or more primary links (thick lines). If this is not so, as many virtual primary links as necessary are added and as many real secondary links as necessary are transformed into real primary links: in the example illustrated in FIG. 4, a single primary virtual link is added and a real secondary link is transformed into a real primary link.

During the same step, virtual secondary links are added to connect the selected leaf to the coordination module for the chunk under consideration. One secondary virtual link per processing operation is added. These secondary virtual links allow the coordination module to be informed when a processing session can be freely terminated on each calculation node in the chunk under consideration without risk of it being locked by a lack of data usable by the processing operation.

The initialisation of a chunk that was described earlier could also be predetermined by an operator. But, as described earlier, any one of steps 104(i) may be executed automatically by the device 10 from knowledge of the multi-graph divided into chunks, using the deterministic definition of steps 300(i), 302(i) and 304(i) to be executed. More specifically, these steps may, for example, be executed by the host processor 12 and the results of these steps (newly created virtual links, modified real links) then stored in memory in the device 10.

Details of any one whatsoever of the synchronisation steps 108(i) in a given chunk i will now be given with reference to FIG. 5, which schematically represents the general functional structure of a calculation node and in particular of the coordination module. Synchronisation is carried out by the application of a predetermined communication protocol on the functional structure of the nodes of the chunk under consideration.

In a preferred embodiment of the invention, the envisaged communication protocol includes the sending, by any one of the calculation nodes of the chunk under consideration, of an information message for opening a session, once a processing session starts on this node. This information message includes, for example, a first field which actually identifies a session opening information message, a second field which identifies a processing operation, a third field which identifies the node sending this message to the receiver node and a fourth field which identifies the destination node for the message or, in an equivalent manner, the path that this message must follow to reach its destination.

In this preferred embodiment, each calculation node 62 in the chunk under consideration includes at least one input/output interface 64 for transmitting data (usable data and/or information messages), a calculator 66 for executing processing sessions, a local memory 68 for storage of contexts and a loader 70 for loading contexts into the calculator. A context is a micro-program which allows the calculation node to carry out a task, that is, to participate locally in the execution of a specific processing session. The local memory 68 can store several contexts when the processing node 62 is multivalent.

Furthermore each calculation node 62 includes means of storage (i.e. local memory) for tables of predetermined parameters. Certain of these tables are static, so-balled configuration tables: the data that they contain are used to define what information messages the node 62 must receive or send before carrying out such and such an action for a given processing operation. Other tables are dynamic, so-called working tables: the data that they contain and which changes dynamically is used to identify what information messages the node 62 has received or sent at any moment for a given processing operation. In the envisaged embodiment, the calculation node 62 includes a set of six tables per processing operation. In practice it includes as many sets of such tables as there are processing operations that it can execute, but a single set of tables is shown in FIG. 5, only for the purposes of simplification.

For any processing operation T whatsoever, a first binary configuration table TAB1, in which each bit corresponds to a potential source node of the chunk to which calculation node 62 belongs, identifies, by means of bits at "1", the nodes from which calculation node 62 must receive a session opening information message for processing operation T before itself being able to open this session. In the example illustrated in FIG. 5, identifying the potential source nodes of the calculation node 62 from N0 to N7, from the first low weight bit at the right end of the table TAB1 to the eighth heavy bit at the left end of the table TAB1, nodes from which the calculation node 62 must receive session opening information for processing operation T before being able itself to open this session, are nodes N0 and N1. It will be noted that because of the aforementioned definition of the "primary link", the bits at "1" in the first binary configuration table TAB1 must necessarily relate to source nodes of primary links to the calculation node 62. Optionally, the nodes which are potentially transmitters of messages and/or data are arranged so that the first n bits of low weight (here n=4) relate to the nodes that are likely to send useable data (real links) and the other heavy bits relate to nodes that are not likely to send usable data (virtual signal links).

For the same processing operation T, a second binary configuration table TAB2, whose bits correspond to the same nodes as in table TAB1, identifies, by means of bits at "1", those nodes from which calculation node 62 must receive a session opening information message for processing operation T before being able to consider that the session that is underway will be terminated when it has itself executed its task for this session. In the example illustrated in FIG. 5, the bits at "1" in the table TAB2 correspond to nodes N0, N1, N4 and N5. It will be noted that all the bits at 1 in the first binary configuration table TAB1 are also at "1" in the second binary configuration table TAB2. But table TAB2 contains other bits at "1" which may relate to source nodes for secondary links to the calculation node 62.

For the same processing operation T, a third binary configuration table TAB3 identifies the nodes to which the calculation node 62 must send session opening information messages for the processing operation T once it has actually opened this session. Each line in this table identifies a potential destination node in the third column. The first column uses a bit at "1" to show, for processing operation T, which nodes must actually be destination nodes for these messages. The second column gives the identifier of node 62 in the tables TAB1 and TAB2 of the node identified in the third column. The third column identifies, either directly the destination node of the message, or equivalently the path that the message must follow in order to reach its destination.

Furthermore, for the processing operation T, a first binary working table TAB4, whose bits correspond to the same nodes as in TAB1 and TAB2, identifies by means of bits at "1" the nodes from which calculation node 62 has received a session opening information message for the session of processing operation T that is underway. At initialisation all bits in this table are at "0". A second binary working table TAB5, whose bits correspond to the same nodes as in TAB4, identifies by means of bits at "1" those nodes from which calculation node 62 has received a session opening information message for the following session of processing operation T. At initialisation all bits in this table are also at "0". This table fulfils a buffer memory function.

Finally, for the processing operation T, a third binary working table TAB6, whose bits correspond to the bits in the first column of the third configuration table TAB3, identifies by means of bits at "1" those nodes to which calculation node 62 has sent a session opening information message for the session that is underway. At initialisation all the bits in this table are also equal to "0".

At the start of the synchronisation step 108(i), for each processing operation all the bits in the working tables TAB4, TAB5 and TAB6 which correspond to the calculation node 62 are at "0".

During the execution of at least one processing operation, the calculation node 62 receives session opening information messages coming from the nodes to which it is linked as a destination by real or virtual links, both primary and secondary as established beforehand and/or during the steps 300(*i*), 302(*i*) and 304(*i*).

When it receives a session opening information message for a processing operation T, if this message relates to the session awaiting execution of this processing operation, referred to as the current session, the bit which corresponds to the sender node in the table TAB4 changes to "1". If it relates to the next session, the bit corresponding to the sender node in table TAB5 changes to "1". By default, an information message is considered to relate to the current session, unless the corresponding bit in the table TAB4 is already at "1", in which case it is considered to relate to the next session.

As long as the first working table TAB4 does not contain the first configuration table TAB1, in other words, as long as all the bits at "1" in TAB1 are not equal to "1" in TAB4, the current session does not start on node 62. On the other hand, once this condition is met, node 62 sends session opening information messages to the destination nodes identified in the third configuration table TAB3, to inform them that it is starting the current session. Each time such an information message is sent by the node 62, the corresponding bit changes to "1" in the third working table TAB6.

When the third working table TAB6 is equal to the first column of the third configuration table TAB3, the current session actually starts on calculation node 62. According to a data exchange protocol which is conventional and details of which will therefore not be given, node 62 receives calculation data from the nodes to which it is linked as a destination by means of real links. In particular this data exchange protocol can advantageously ensure that the usable data for the processing operation is only transmitted by a sender node if the destination node has sufficient space to receive it. This may be implemented by sending data packets only on receipt of packets of credits sent by the destination node.

During the execution of the processing session T, information messages may still be received which relate to this processing operation. As indicated earlier, if this involves messages relating to the nodes whose corresponding bit is already at "1" in TAB4, then table TAB5 relating to the next session is updated. Otherwise, by default, it is TAB4 that is updated. Naturally, during the execution of the processing session T, information messages may also be received which relate to other processing operations: other sets of tables are then updated.

When the first working table TAB4 contains the second configuration table TAB2, in other words when all the bits that are at "1" in TAB2 are also equal to "1" in TAB4, the current session is regarded as being capable of being fully completed in the chunk under consideration and node 62 is regarded as being available for the execution of another session, whether this is the following session of the same processing operation or a session of another processing operation, as soon as it has itself completed its task for the current session.

Thus when the first working table TAB4 contains the second configuration table TAB2 and the execution of the current session by the calculation node 62 is complete, the latter is ready to select a new session in order to start it. The content of table TAB4 is then replaced by that of table TAB5 and the contents of working tables TAB5 and TAB6 are reinitialised to "0". Node 62 may then select the first of the processing operations from the processing operations that are underway, for which the first processing table TAB4 contains configuration table TAB2.

Figure 5:
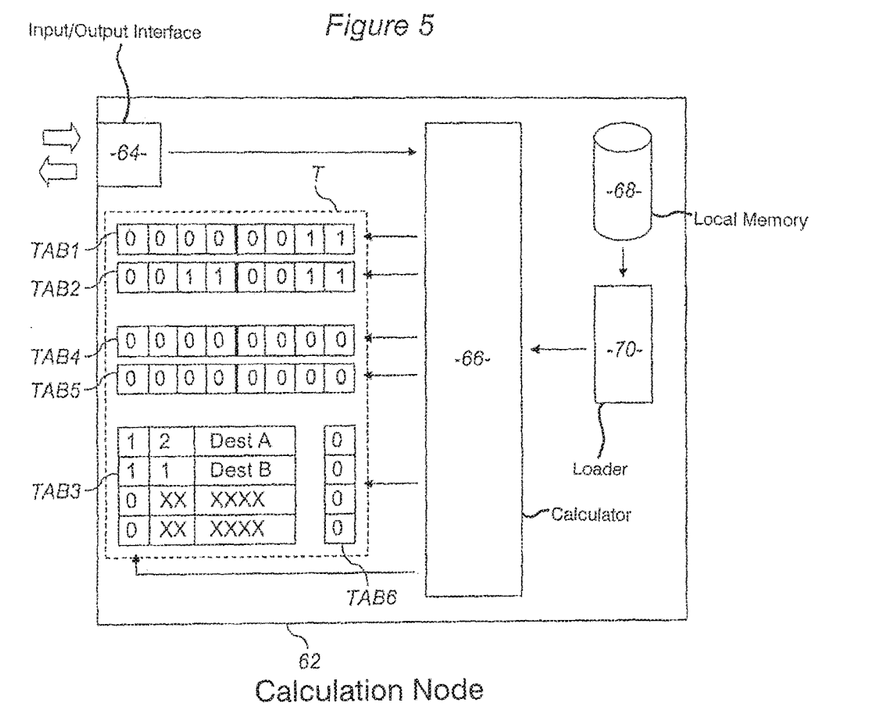
FIG. 5 is a schematic representation of the general functional structure of a calculation node in the device in FIG. 1, according to one embodiment of the invention.

In the aforementioned embodiment of the invention, in which each chunk is initialised in accordance with steps 300 (*i*), 302(*i*) and 304 (*i*) and in which all the calculation nodes operate in the manner for which details are given with reference to FIG. 5, one advantage is that the calculation node selected as the coordination node does not operate differently from the others. It only fulfils its general chunk synchronisation function because specific virtual links have been created in the multi-graph of the chunk:
   primary virtual links to redirect all input links entering the chunk multivalent set to the coordination module.
   secondary virtual links to the coordination module, coming for each processing operation from a selected leaf on the minimum spanning tree for the multivalent set for the chunk.

Another advantage rests in the fact that, thanks to the addition of these virtual links from and towards the coordination module, there is a guarantee that a check is made that all usable data for a processing operation are actually present in all input buffer memory nodes before selecting a session of this processing operation. Alternatively, the presence of only a predetermined portion of usable data may be required in the input buffer memory also (for example a minimum of 32 bits): it all depends on the rule that is chosen for sending a session opening information message from a buffer memory node. Similarly, checks can be made that all the output buffer memory nodes are capable of receiving the data processed by a processing operation, or at least a predetermined portion, before selecting a session of this processing operation.

It should also be noted that in this example of implementation, messages of information useful for the synchronisation of sessions to be executed follow the transmission of data, gradually propagating themselves in the chunk under consideration.

It is clear that a device for processing digital data such as that described above allows improvements in loading of resources, relative to a conventional centralised synchronisation device.

Besides, the specific implementation described above allows the coordination module for each chunk in the processing multi-graph to be simply and implicitly identified.

Furthermore, the synchronisation function of the coordination module requires no specific additional resources, since the coordination module is chosen from the calculation nodes of the chunk with which it is associated, and since it only fulfils its specific function because session opening information message virtual transmission links are created to and/or from this coordination module. For the same reasons, any node in the chunk could, a priori, fulfil this coordination function.

It should also be noted that the invention is not restricted to the embodiments described above.

As has been stated already, the coordination module of a chunk could alternatively be outside the chunk or could fulfil a coordination function only. Furthermore, the communication protocol described above is advantageous, but is not the only one that can be envisaged. In particular, there could alternatively be no distinction made between primary and secondary links, but a distinction between primary and secondary information messages. In this case, the functional organisation of each calculation node would be modified.

In general terms, those skilled in the art will appreciate that various modifications may be made to the embodiment described above, in the light of the information that has just been divulged. In the claims that follow, the terms used must not be regarded as restricting the claims to the embodiment presented in the present description, but must be interpreted as including all the equivalents that the claims aim to cover as a result of their formulation and the prediction of which is within the power of those skilled in the art by applying their general understanding to the implementation of the information that has just been divulged to them.

The invention claimed is:

1. A device for processing digital data of a system on electronic chip type, the device comprising:
  a plurality of different calculation nodes and buffer memory nodes, the device using distributed execution of multiple data processing operations on the calculation nodes using a data-flow processing model in which each data processing operation destined to be carried out on the device is modelled by a directed graph which is made up of the calculation nodes of the device, the buffer memory nodes of the device, and directed links for transfer of data through the calculation nodes and the buffer memory nodes of the device from at least one input buffer memory node to at least one output buffer memory node; and
  an identification processor configured to, from a valued directed multi-graph, which illustrates a relationship between each of the data processing operations and each of the plurality of different calculation nodes and the buffer memory nodes of the device, including a data processing operation that each different calculation node executes, and which is made up of a union of several distinct processing graphs divided into several valued directed sub-multi-graphs called chunks, input and output nodes of the chunks being buffer memory nodes of the multi-graph, and at least an output buffer memory node of a first chunk of the chunks being an input buffer memory node of a second chunk of the chunks, select a coordination module for each chunk from among the calculation nodes of the respective chunk, such that the coordination module is a calculation node of a sub-set of the respective chunk having the most output links to other first nodes or the most input links from other second nodes, wherein
  the identification processor determines the other first nodes according to a first criterion, and the other second nodes according to a second criterion,
  at least one calculation node of the plurality of different calculation nodes that is included in one of the chunks, is configured to perform two different processing operations of the multiple data processing operations,
  each selected coordination module is configured to synchronise portions of processing operations that are to be executed in the chunk with which the respective coordination module is associated, independently of portions of processing operations that are to be executed in other chunks, and
  the plurality of different calculation nodes and buffer memory nodes are hardware components.

2. The device for processing digital data according to claim 1, wherein the identification processor that selects the coordination module of any one of the chunks establishes directed links referred to as virtual links for transmission of information messages without transmission of data to be processed, and established, in addition to data transfer links, between the coordination module and other nodes in the respective chunk.

3. The device for processing digital data according to claim 2, wherein each calculation node of any one of the chunks is configured to
  only start a portion of processing operation once the respective calculation node has received at least one information message for starting the portion of processing operation coming from at least one other predetermined node in the chunk of the respective calculation node via at least one of the directed links of graph for the processing operation, and
  send at least one information message for starting the portion of processing operation to at least one other predetermined node in the chunk of the respective calculation node via at least one of the directed links of the graph for the processing operation, as soon as the respective calculation node has started the portion of the processing operation.

4. The device for processing digital data according to claim 1, wherein the coordination module of a chunk includes an interface configured to transmit data,
  a calculator configured to execute two processing operations,
  a local memory configured to store a micro-program that allows the coordination module to carry out the two processing operations, and
  a loader configured to load the micro-program into the calculator to carry out the two processing operations.

5. The device for processing digital data according to claim 1, wherein the one of the chunks includes only four calculation nodes, the four calculation nodes including the at least one calculation node, a second calculation node, a third calculation node configured to perform processing corresponding to only one of two processing operations, and a fourth calculation node configured to perform processing of both the two processing operations.

6. The device for processing digital data according to claim 1, wherein the identification processor selects the coordination module for each chunk from among the calculation nodes of the respective chunk, such that the coordination module is the calculation node having the most output links to the other first nodes.

7. The device for processing digital data according to claim 1, wherein the identification processor selects the coordination module for each chunk from among the calculation nodes of the respective chunk, such that the coordination module is the calculation node having the most input links from the other second nodes.

8. A distributed execution method for multiple data processing operations on a plurality of different calculation nodes of a system on electronic chip for processing digital data, the system on electronic chip further including buffer memory nodes, the system on electronic chip using a data-flow processing model in which each data processing operation destined to be executed on the system on electronic chip is modelled by a directed graph which includes calculation nodes of the system on electronic chip, the buffer memory nodes of the system on electronic chip, and directed links for transferring data through the calculation nodes and the buffer memory nodes of the system on electronic chip from at least one input buffer memory node to at least one output buffer memory node, the distributed execution method comprising:
  from a valued directed multi-graph, which illustrates a relationship between each of the data processing operations and each of the plurality of different calculation nodes and the buffer memory nodes of the system on electronic chip, including a data processing operation that each different calculation node executes, and which is made up of a union of several distinct processing graphs, dividing the valued directed multi-graph into several valued directed sub-multi-graphs called chunks, input and output nodes of each chunk being buffer memory nodes;

selecting a coordination module for each chunk from among the calculation nodes of the respective chunk, such that the coordination module is a calculation node of a sub-set of the respective chunk having the most output links to other first nodes or the most input links from other second nodes, wherein the other first nodes are determined according to a first criterion, and the other second nodes are determined according to a second criterion, and at least an output buffer memory node of a first chunk of the chunks being an input buffer memory node of a second chunk of the chunks;

performing two different processing operations of the multiple data processing operations by at least one calculation node of the plurality of different calculation nodes, the at least one calculation node being included in one of the chunks; and synchronizing portions of processing operations that are to be executed in each chunk by a corresponding coordination module, independently of the synchronization of portions of processing operations that are to be executed in other chunks, wherein the plurality of different calculation nodes and buffer memory nodes are hardware components.

9. The distributed execution method for multiple data processing operations according to claim 8, further comprising automatically selecting the coordination module for each chunk.

10. The distributed execution method for multiple data processing operations according to claim 9, wherein the automatically selecting of the coordination module for each chunk further includes
subdividing the respective chunk into three disjoint sub-sets, where a first sub-set (E1) referred to as a source univalent set includes all input nodes of the respective chunk and all other univalent nodes of the respective chunk which are reached from the input nodes but not from a multivalent node, where a second sub-set (E2) referred to as a sink univalent set includes all output nodes of the respective chunk and all other univalent nodes of the respective chunk which reach the output nodes but not a multivalent node, and where a third sub-set (E3), referred to as a multivalent set, includes all nodes of the respective chunk which do not belong to either the first or second sub-set, and selecting the coordination module from one of the calculation nodes of the multivalent set which are destinations of a data transfer directed link which comes from the source univalent set.

11. The distributed execution method for multiple data processing operations according to claim 10, wherein the selecting of the coordination module is performed in response to the coordination module being one of
a destination calculation node of a directed link from the source univalent set (E1) which exhibits the most output links leaving to other destination nodes of a directed link coming from the source univalent set, and
a destination calculation node of a directed link from the source univalent set (E1) which receives the most input links from nodes of the source univalent set.

12. The distributed execution method for multiple data processing operations according to claim 11, wherein the selecting of the coordination module of each chunk includes the following for each directed data transfer link, referred to as a transition link, which comes from the source univalent set and which points towards the multivalent set:
creating a new virtual link between a node of origin of the transition link and the coordination module of a chunk, when a link or set of links does not already exist for the same processing operation between the node of origin of the transition link and the coordination module of a chunk, and
creating a new virtual link between the coordination module of a chunk and a node towards which the transition link points, when a link or set of links does not already exist for the same processing operation between the coordination module of a chunk and the node towards which the transition link points.

13. The distributed execution method for multiple data processing operations according to claim 8, wherein the selecting of the coordination module for each chunk includes establishing directed links referred to as virtual links for transmission of information messages without transmission of data to be processed, in addition to data transfer links, between the coordination module and the other nodes of the chunk.

* * * * *

UNITED STATES PATENT AND TRADEMARK OFFICE
CERTIFICATE OF CORRECTION

PATENT NO. : 9,569,272 B2
APPLICATION NO. : 12/833418
DATED : February 14, 2017
INVENTOR(S) : Yvain Thonnart It is certified that error appears in the above-identified patent and that said Letters Patent is hereby corrected as shown below:

On the Title Page

Item (73), the Assignee's Name is incorrect. Item (73) should read:
-- (73) Assignee: Commissariat a l'energie atomique et aux energies alternatives,
Paris (FR) --

Signed and Sealed this
Tenth Day of April, 2018

Andrei Iancu
*Director of the United States Patent and Trademark Office*